June 11, 1974     B. F. GOOSEY     3,816,586
METHOD OF FABRICATING BORON SUBOXIDE ARTICLES
Filed March 21, 1972

June 11, 1974   B. F. GOOSEY   3,816,586
METHOD OF FABRICATING BORON SUBOXIDE ARTICLES
Filed March 21, 1972   2 Sheets-Sheet 2

United States Patent Office 3,816,586
Patented June 11, 1974

3,816,586
METHOD OF FABRICATING BORON
SUBOXIDE ARTICLES
Benjamin F. Goosey, Anderson, S.C., assignor to the United States of America as represented by the Secretary of the Air Force
Filed Mar. 21, 1972, Ser. No. 236,632
Int. Cl. C04b 35/62
U.S. Cl. 264—332                 3 Claims

ABSTRACT OF THE DISCLOSURE

A method is provided for fabricating articles of boron suboxide and other boron-oxygen compositions in which a mixture of boron and boric oxide is initially compressed in a metal die lined successively with sheets of graphite and tantalum. After release of the pressure on the resulting compacted article, it is covered with a layer of a mixture of boron nitride and boric oxide. The compacted article coated with the aforementioned mixture is then subjected to a second compressing step in the lined die while heating the die at a temperature sufficient to melt the boric oxide in the compacted article. After allowing the die to cool, the compacted article, now coated with boron nitride, is removed from the metal die and placed in a graphite die coated with boron nitride and lined with a sheet of tantalum. While compressing the compacted and coated article in the graphite die at increasing pressure, the die is heated in an inert atmosphere or under a vacuum. After permitting the graphite die to cool, the compacted and coated article is removed therefrom. An article of boron suboxide or other boron-oxygen composition is then obtained after removal of the boron nitride coating.

FIELD OF THE INVENTION

Figure 1:
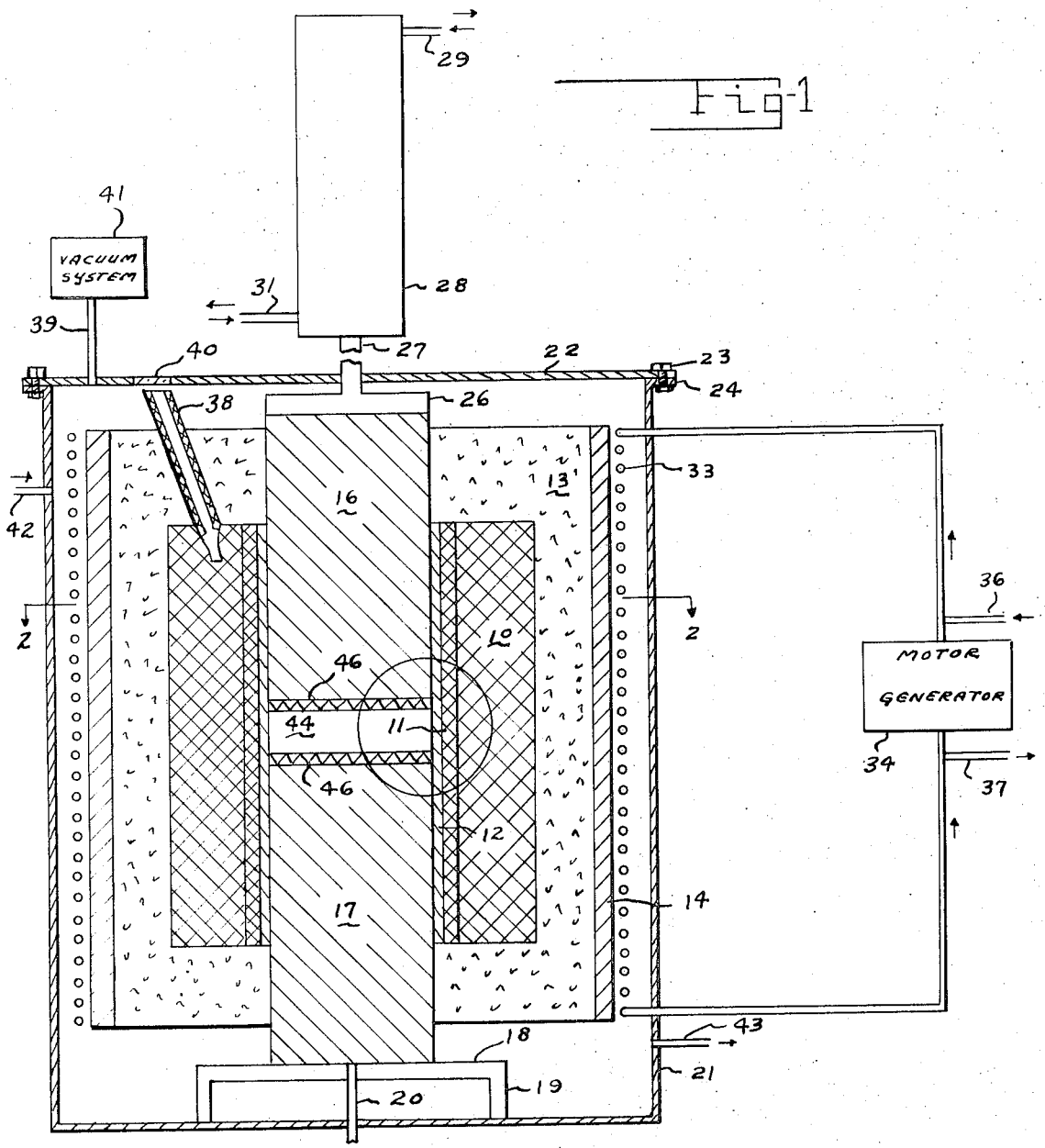

The present invention relates particularly to boron suboxide articles. In one aspect it relates to a method of fabricating articles of boron suboxide or other boron-oxygen compositions.

BACKGROUND OF THE INVENTION

Boron suboxide is a known compound which can be formed by the chemical reaction between boron and boric oxide. The reaction proceeds in accordance with the following equation:

$$16B + B_2O_3 \rightarrow 3B_6O.$$

While in theory it appears that it should be a relatively simple matter to prepare boron suboxide, in actual practice efforts in the past to fabricate sound boron suboxide articles have not proven to be successful.

In order to prepare boron suboxide, it is necessary to subject a mixture of boron and boric oxide to high pressures and temperatures. However, mixtures of boron and boric oxide are extremely difficult to handle. If a mixture is merely compressed and heated in a die to cause the desired reaction, the resulting boron suboxide article is rough and contains flaws. Since temperatures on the order of 2000° C. are required in conducting the reaction, it is necessary to employ a die fabricated from a graphitic material. However, use of such a die presents problems because the boron and the boric oxide have a tendency to react with the carbon of the die as well as with each other. Thus, upon completion of the reaction, the article tends to adhere to the die walls, thereby rendering its removal difficult. Great pressures are often required with the result that the article comes out in pieces rather than as a smooth, sound boron suboxide body.

It is an object of this invention, therefore, to provide a method of fabricating a smooth, sound, reaction-free boron suboxide body.

Another object of the invention is to provide an apparatus used in the method for fabricating boron suboxide articles.

Still another object of the invention is to provide articles of boron suboxide and other boron-oxygen compositions which are free of flaws and contaminants or impurities.

A further object of the invention is to provide an article fabricated from boron suboxide which has outstanding physical properties, particularly as regards high hardness and high modulus of elasticity and low density.

Figure 2:
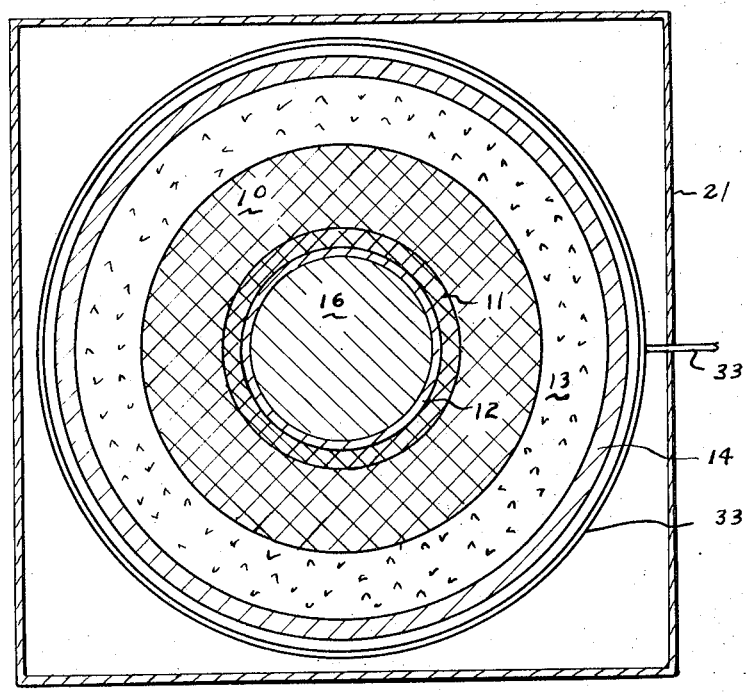
Figure 3:
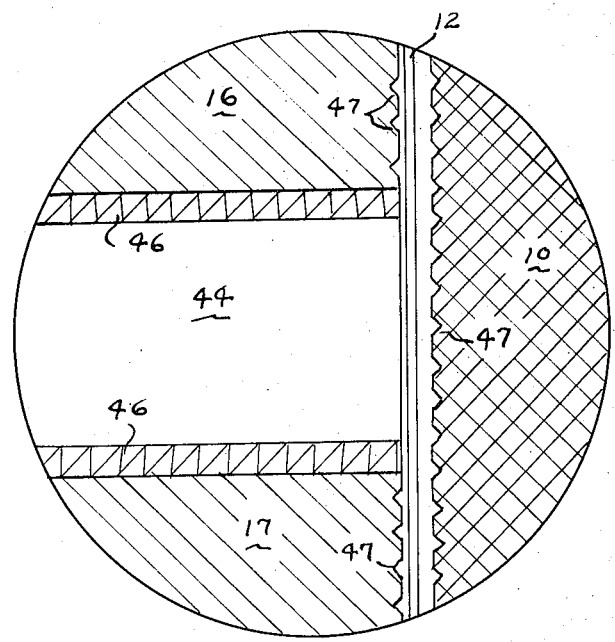

Other objects and advantages of the invention will become apparent to those skilled in the art upon consideration of the accompanying disclosure and the drawing in which:

FIG. 1 is an elevational view, partly in cross section, illustrating apparatus used in practicing the method of this invention, FIG. 2 is a plan view taken along line 2—2 of FIG. 1, and FIG. 3 is an enlarged view of a portion of the apparatus shown in FIG. 1.

SUMMARY OF THE INVENTION

In one embodiment, the present invention resides in a method of fabricating an article or body of boron suboxide or other boron-oxygen composition. Broadly speaking, the method comprises the steps of compressing a mixture of boron and boric oxide in a tantalum-lined compression zone; releasing the pressure on the resulting compacted article; coating the compacted article with a layer of a mixture of boron nitride and boric oxide; compressing the coated article in the tantalum-lined compression zone while heating the zone at a temperature sufficient to melt the boric oxide in the compacted article; allowing the tantalum-lined compression zone to cool and removing therefrom the compacted article coated with boron nitride; compressing the coated compacted article under a vacuum or in an inert atmosphere at an elevated pressure in a compression zone formed of graphite coated with boron nitride adjacent the article and separated therefrom with a sheet of tantalum while heating the zone at an elevated temperature, the pressure and temperature being sufficient to cause the boron and boric oxide to react; after allowing the compression zone to cool, recovering the coated compacted article therefrom; and removing the boron nitride coating, thereby obtaining a sound article of boron suboxide or other boron-oxygen composition.

In another embodiment, the invention resides in an apparatus particularly adapted for conducting the final compressing and heating steps of the above-described method. The apparatus comprises a graphite die member having an opening coated with boron nitride extending therethrough; a sheet of tantalum lining the opening and in contact with the boron nitride coating; a pair of opposed graphite plungers coated with boron nitride and movably positioned in the opening, the plungers having a configuration conforming to that of the opening; insulating means encompassing the graphite die member; and an electrically conductive coil surrounding the insulating means.

It has been discovered that by proceeding in accordance with the present method, it is now possible to fabricate sound boron suboxide articles or bodies that are substantially free of contaminants. As a result the product possesses outstanding physical properties, particularly as regards hardness and modulus of elasticity, that renders it eminently suitable for a variety of applications. For example, cutting tools and ceramic bearings as well as lightweight ceramic armor can be fabricated from boron suboxide. Also, the boron suboxide is useful as a grinding media.

In the initial step of preparing the boron suboxide, a mixture of boron and boric oxide is cold pressed in a metal die. The metal die is preferably formed of steel although other metals can be used, such as tungsten and molybdenum, that are capable of withstanding the pressures involved. The pressure employed in the cold pressing step can vary within rather wide limits, but it is usually in the range of about 1000 to 3000 p.s.i. The mixture used generally contains about 60 to 90 weight percent boron and about 10 to 40 weight percent oxygen. However, in order to obtain a boron suboxide ($B_6O$) free of boron and boric oxide ($B_2O_3$), a mixture consisting of 71.3 weight percent boron and 28.7 weight percent boric oxide is utilized. Lesser amounts of boron result in other boron-oxygen compositions, i.e., a boron suboxide product containing free boric oxide while a product prepared from a mixture containing greater amounts of boron contains free boron.

Conventional steel dies can be employed in the cold pressing step. However, the mold cavity is lined first with a sheet of graphite on which a sheet of tantalum is placed. Also, the surface or surfaces of the pressure exerting means, e.g., a plunger, which contacts the boron-boric oxide mixture, are covered with a sheet of tantalum. This arrangement of apparatus ensures easy removal of the compacted mixture from the mold cavity, which constitutes a compression zone, and prevents any sticking of the mixture to surfaces of the pressure exerting means.

After the cold pressing step, the surfaces of the compacted article are covered or coated with a mixture of boron nitride and boric oxide. The mixture usually contains about 70 to 95 weight percent boron nitride and about 5 to 30 weight percent boric oxide. A preferred mixture consists of 90 weight percent boron nitride and 10 weight percent boric oxide. In a mold comprising a die having opposed plungers, the coating operation may be readily accomplished by removing one plunger, adding the mixture to the exposed surface of the other plunger, inserting the compacted article, adding the mixture to the exposed surface of the article, and then reinserting the plunger in the die opening. The amount of the mixture used will depend upon the size of the article to be covered. The amount added is, in general, that which is sufficient to provide a layer having a thickness ranging from about 25 to 150 mils.

The compacted article, now coated with a mixture of boron nitride and boric oxide, is subjected to a second pressing step which can take place in the same mold as the initial step. During this step the mold is heated over a period of from about 20 to 40 minutes from room temperature (about 25° C.) to 450° C. Or to define the amount of heating in another manner, the mold is heated over the indicated period of time to a temperature sufficient to melt the boric oxide in the compacted article. The pressure applied initially in this step generally ranges from about 1000 to 2000 p.s.i. After melting of the boric oxide occurs, the preessure is increased to about 5000 to 6000 p.s.i. Thereafter, the mold is allowed to cool to room temperature, and the compacted article now coated with boron nitride is removed from the mold cavity.

The dense article recovered from the mold cavity with boron nitride bonded to its surfaces is next subjected to a pressure sintering step that is carried out in the apparatus shown in the drawing. In the figures of the drawing, identical reference numerals have been used for identifying the same elements. Referring now to FIGS. 1 and 2, a combination die assembly and induction furnace is illustrated that is particularly adapted for conducting the reaction between the boron and boric oxide so as to provide a sound boron suboxide article or body. While the apparatus can also be utilized in carrying out the two compression steps described above, it is usually preferred to use a metal mold in these initial steps.

As shown in FIGS. 1 and 2, the apparatus comprises a graphite die 10 which, as illustrated, is cylindrical in shape with a cylindrical opening or cavity formed therein and having the same longitudinal axis as the die. It should be understood, however, that the opening in the die can assume other configurations, e.g., openings with elliptical, square or irregularly shaped horizontal cross sections, depending upon the shape of the article desired. The opening or cavity of the metal die assembly used in the initial compression steps corresponds to that in die 10. The opening in die 10 is coated with a layer 11 of boron nitride while a sheet 12 of tantalum covers the boron nitride layer. The thickness of the boron nitride layer is generally in the range of about 25 to 150 mils.

Surrounding the graphite die is a layer of insulating material 13 which is capable of withstanding the high temperatures to which the die is subjected. The preferred insulating material is graphite felt although other materials such as carbon black can be utilized. The graphite felt is encompassed and held in place by a quartz tube 14 which also functions as an insulator. When a material such as carbon black is employed as the insulating means, the quartz tube is provided with a bottom closure member so as to contain the black. The function of the insulating material is to prevent the escape of heat from the graphite die when it is heated by induction as described hereinafter.

Disposing within the opening or cavity of die 10 is a pair of graphite plungers 16 and 17 which function as pressure exerting means. As shown the plungers are cylindrical in shape as in the die opening. In the event that the opening is other than cylindrical as mentioned hereinabove, then the plungers are correspondingly shaped. Also, the force exerting surfaces of the plungers can be other than flat without departing from the spirit and scope of the invention. The diameter of the plungers is slightly less, e.g., from 10 to 40 mils, than that of the opening so that they may be movable therein.

The lower plunger 17 rests on a platform or base 18 which is in turn supported by legs 19. A rod 20 passing through enclosure 21 and platform 18 contacts the bottom of plunger 17 to provide means for removing the plungers by pushing them through the die opening. The legs of the platform are attached by suitable means to the bottom of enclosure 21 which completely encloses the die assembly. As illustrated, the enclosure is substantially in the shape of a cube open at its upper end and having a top closure member 22 secured thereto by a plurality of bolt and nut assemblies 23. A gasket (not shown) is positioned between closure member 22 and flange 24 to ensure that the enclosure remains airtight. While the enclosure is shown as being cubical in shape, it is within the purview of the invention to use other forms of enclosures, e.g., one that is cylindrical in shape. Furthermore, the enclosure can be provided with one or more windows, which may be removable, so that the operation of the die assembly can be observed.

A plate member 26 is positioned against the upper end of upper graphite plunger 16. The plate is connected by means of rod 27 to a piston (not shown) disposed in hydraulic cylinder 28. Attached to the hydraulic cylinder are lines 29 and 31 which provide means for introducing and withdrawing hydraulic fluid from the cylinder so as to move its piston. Introduction of a hydraulic fluid by means of a pump (not shown) forces the hydraulic piston downwardly, thereby applying pressure to plunger 16 as a result of the concomitant movement of plate member 26. By terminating introduction of fluid through line 29 while introducing fluid through line 31, the plate member through the operation of the hydraulic piston is moved upwardly away from the upper face or surface of plunger 16. At the same time hydraulic fluid is expelled from the upper portion of the hydraulic cylinder through line 29. The distance that the plate can be moved upwardly is sufficient to permit removal of the plungers through the upper end of the opening in die 10.

Surrounding the die assembly is a coil 33 which is in the form of a metal tube, preferably copper tubing. The ends of the coil are attached to motor generator 34 which supplies alternating current of a controlled number of cycles. Inlet line 36 and outlet line 37 provide means for circulating a coolant, such as water, through the coil so as to prevent its overheating. A sight tube 38 extending into die 10 and in line with window 40 in enclosure 21 makes it possible to determine the temperature of the die at any desired time by utilizing an optical pyrometer (not shown) positioned outside of the enclosure.

One end of line 39 communicates with the interior of enclosure 21 while its other end is connected to a vacuum system 41 which includes an oil diffusion pump backed by a mechanical pump. By this arrangement of apparatus, the enclosure can be maintained under a vacuum. It is also within the purview of the invention to circulate an inert gas, such as argon, helium or nitrogen, through the enclosure by means of lines 42 and 43 if it is desired to conduct the compression and heating step under an inert atmosphere.

In the foregoing description rod 20, connecting rod 27 and the ends of tubular coil 33 have been described as extending through enclosure 21. It is to be understood that appropriate seals are provided to prevent leakage where these elements pass through the enclosure.

In carrying out the pressure sintering step in the apparatus of FIG. 1, the compacted article 44 with its coating 46 of boron nitride is positioned between plungers 26 and 17. In order that this may be accomplished, closure member 22 must first be removed and plate member 26 withdrawn so as to permit removal of plunger 16. These elements are then reassembled so that the article is in the position shown in FIG. 1.

After the article is positioned between the two plungers, enclosure 21 is evacuated by means of vacuum system 41. Alternatively, instead of maintaining a vacuum in the enclosure, an inert gas can be circulated through the enclosure by means of lines 42 and 43 after a vacuum has been established. Thereafter, an atmosphere of an inert gas is maintained in the enclosure.

A hydraulic fluid is now introduced into cylinder 28 through line 29 until the pressure exerted on article 44 by plunger 16 is in the range of about 750 to 1500 p.s.i. The temperature of die 10 during this initial compressing step is at about room temperature. The die assembly is then heated inductively to about 1900 to 2000° C. while increasing the pressure to about 3500 to 5500 p.s.i. The induction heating is accomplished by passing an alternating current, e.g., a 1000 cycle alternating current, from motor generator 34 through coil 33. Heating is conducted so that the temperature is increased at the rate of about 4 to 30° C. per minute. The heating is preferably controlled so that the temperature of the die is raised at the rate of about 10 to 20° C. per minute until 1000° C. is reached. Thereafter, the rate is decreased to about 4 to 8° C. per minute until 1500° C. is attained. Heating is then continued up to a maximum of 2000° C., the temperature being raised at the rate of about 5 to 15° C. per minute.

After the schedule of heating is carried out under pressure as described in the preceding paragraph, pressure is released and the die assembly is allowed to cool to room temperature. The article coated with boron nitride is then removed from the die by withdrawing plunger 16 after disassembly of the apparatus as described hereinabove. Removal of the plunger is facilitated by forcing rod 20 upwardly, thereby moving the plungers out of the die opening. It is within the scope of the invention to employ a hydraulic ram to force the plungers from the die opening in the event greater pressures are necessary to remove the plunger than can be provided by rod 20. Article 44 with its bonded boron nitride coating is then recovered after which the coating is removed as by scraping or by light tapping with a hammer.

The product recovered is a sound boron suboxide article that is smooth and free of flaws and contaminants. While the steps as described above are all important in overcoming the problems of the prior art in preparing such a product, the apparatus utilized in the pressure sintering step plays a particularly important role in achieving the objects of this invention. The fact that the graphite die opening or cavity and the plungers are coated with boron nitride and that these two coated surfaces are separated by a sheet of tantalum lining the die opening and that the surfaces of the article are coated with boron nitride contributes to a great extent to the unexpected results obtained by obviating the occurrence of reactions between graphite die and plungers and the composited article. For a better showing of this aspect of the invention reference is made to FIG. 3, an enlargement of the indicated portion of FIG. 1. As showing in FIG. 3, the opening in die 10 and plungers 16 and 17 are provided with spiral threads 47. Prior to use, the surfaces of the die opening and the plungers are coated with a slurry of boron nitride in a hydrocarbon, such as benzene, toluene or a xylene. Care is taken to ensure that all of the threads are completely filled and that the graphite surfaces are covered. The die and the plungers are then heated in an oven at a temperature sufficient to evaporate the hydrocarbon used. As a result of this procedure, a smooth boron nitride coating is obtained that adheres to the graphite surfaces.

A more complete understanding of the invention can be obtained by referring to the following illustrative examples which are not intended, however, to be unduly limitative of the invention.

EXAMPLE I

A boron suboxide article in the form of a disc was prepared, utilizing a mixture of 35.65 grams of boron and 14.35 grams of boric oxide. Initially the mixture was cold pressed in a steel die having a cylindrical opening therethrough. The opening was first lined with a sheet of graphite having a thickness of about 25 mils (Grafoil flexible graphite—Union Carbide Corporation) which was then covered with a 5 mil thick sheet of tantalum. The pressure exerting surfaces of the two plungers were also covered with tantalum sheets. In this initial step, the mixture was subjected at room temperature to a pressure of 1000 p.s.i. Both plungers with the tantalum sheets on their surfaces were then removed from the die and a mixture of 10 grams of boron nitride and 1 gram of boric oxide was added to each side of the compressed article. The die assembly was then subjected to a pressure of 1000 p.s.i. and heated by a two-piece "clam shell" heater having a diameter such as to fit snugly around the die. The rate of heating was such that a maximum temperature of 450° C. was reached in about 30 minutes. After permitting the die assembly to cool to room temperature, the compacted article having boron nitride bonded to its surfaces was removed from the die.

The compacted article coated with boron nitride was then pressure sintered in apparatus similar to that shown in FIG. 1. The diameter of the plungers used was about 25 mils less than the diameter of the die opening. The vertical surfaces of the plungers and the die opening had been machined so as to have a spiral thread (twelve per inch) with a depth of 20 mils. The threaded surfaces were coated with a slurry of boron nitride in toluene; care was taken to ensure that all threads were completely filled. The coated elements were then heated in an oven at 70° C. to evaporate the toluene and provide boron nitride coatings that adhered to the graphite surfaces.

After inserting the bottom plunger into the die opening, the compacted article coated with boron nitride was placed against the top surface of the plunger. The upper plunger was then inserted so that its bottom surface was in contact with the coated article. With the die assembly being maintained in an argon atmosphere, a pressure of 1000 p.s.i. was initially applied with the die assembly at room temperature. The assembly was then heated inductively to 1500° C. while increasing the pressure to 4000 p.s.i. Heating was continued until a maximum of 2000° C. was reached, using a heating rate of 25° C. per minute. The pressure was then released, and the die assembly was allowed to cool to room temperature after which the article was recovered. After removal of the boron nitride coating, a sound boron suboxide article in the form of a disc was obtained.

Tests were conducted on the article and the results are shown below in Table I.

TABLE I

| | |
|---|---|
| Density, g./cm.$^3$* | 2.60 |
| Knoop hardness, 100 g. load | 3000 |
| Young's modulus of elasticity, p.s.i. | $70 \times 10^6$ |

*Calculated density for $B_6O$ equal 2.602 g./cm.$^3$.

Analysis of the product gave 80.1 weight percent boron and 19.9 weight percent oxygen which corresponds to the stoichiometry of $B_6O$. The analysis for boron was done by the wet chemical method while the amount of oxygen was determined by the inert gas fusion method.

TABLE II

| Nominal composition | Analyzed composition, wt. percent | | | Phases present |
|---|---|---|---|---|
| | Boron | Oxygen | Total | |
| $B_5O$ | 77.5 | 22.0 | 99.5 | $B_6O+B_2O_3$ |
| $B_7O$ | 80.7 | 18.3 | 99.0 | $B_6O+B$ |
| $B_8O$ | 82.5 | 16.8 | 99.3 | $B_6O+B$ |

The data in Table II show that the present method provides boron-oxygen compositions containin a predominant amount of boron suboxide when mixtures corresponding to the nominal compositions of other boron oxides are used.

As will be evident to those skilled in the art, various modifications of the invention can be made in the light of the foregoing disclosure without departing from the spirit and scope of the invention.

I claim:
1. A method of fabricating a boron suboxide article which comprises the steps of:
   (1) cold pressing in a tantalum-lined compression zone at a pressure in the range of about 1000 to 3000 p.s.i. a mixture consisting essentially of about 60 to 90 weight percent boron and about 10 to 40 weight percent boric oxide;
   (2) releasing the pressure on the resulting compacted article;
   (3) coating the compacted article with a layer of a mixture consisting essentially of about 70 to 95 weight percent boron nitride and about 5 to 30 weight percent boric oxide, the layer having a thickness ranging from about 25 to 150 mils;
   (4) compressing the coated compacted article in the tantalum-lined compression zone at a pressure ranging from about 1000 to 2000 p.s.i. while heating the zone over a period of about 20 to 40 minutes from room temperature to a temperature sufficient to melt the boric oxide in the compacted article and after melting of the boric oxide occurs increasing the pressure to about 5000 to 6000 p.s.i.;
   (5) allowing the tantalum-lined compression zone to cool and removing therefrom the compacted article coated with boron nitride;
   (6) compressing the coated, compacted article under a vacuum or in an inert atmosphere in a compression zone formed of graphite coated with boron nitride having a thickness of about 25 to 150 mils adjacent to the article and separated therefrom with a sheet of tantalum, the article being compressed initially at room temperature at a pressure of about 750 to 1500 p.s.i. after which the article is heated to about 1900 to 2000° C. while increasing the pressure to about 3500 to 5500 p.s.i.;
   (7) allowing the compression zone to cool and removing the coated, compacted article therefrom; and
   (8) removing the boron nitride coating, thereby obtaining a sound, boron suboxide article.

2. The method according to claim 1 in which the first mentioned mixture consists essentially of about 71.3 weight percent boron and 28.7 weight percent boric oxide.

3. The method according to claim 1 in which the compacted, coated article, after being compressed at room temperature at about 750 to 1500 p.s.i., is heated to about 1000° C. at the rate of about 10 to 20° C. per minute afttr which the temperature is increased to about 1500° C. at the rate of about 4 o 8° C. per minute; and heating is then continued up to about 2000° C. at the rate of about 5 to 15° C. per minute.

References Cited

UNITED STATES PATENTS

| | | | |
|---|---|---|---|
| 3,660,031 | 5/1972 | Holcombe et al. | 423—278 |
| 3,440,312 | 4/1969 | Alliegro | 264—332 |
| 3,673,118 | 6/1972 | Mandorf et al. | 264—332 |

DONALD J. ARNOLD, Primary Examiner

U.S. Cl. X.R.

51—309; 264—65